May 30, 1939. H. J. ROUND Re. 21,105

PICTURE TELEGRAPHY

Original Filed May 11, 1927 2 Sheets-Sheet 1

INVENTOR
HENRY JOSEPH ROUND
BY H. G. Grover
ATTORNEY

May 30, 1939. H. J. ROUND Re. 21,105

PICTURE TELEGRAPHY

Original Filed May 11, 1927 2 Sheets-Sheet 2

INVENTOR
HENRY JOSEPH ROUND
BY H. S. Grover
ATTORNEY

Reissued May 30, 1939

Re. 21,105

UNITED STATES PATENT OFFICE 21,105

PICTURE TELEGRAPHY

Henry Joseph Round, Westfield, Muswell Hill, London, England, assignor to Radio Corporation of America, a corporation of Delaware Original No. 1,759,594, dated May 20, 1930, Serial No. 190,467, May 11, 1927. Application for reissue April 29, 1932, Serial No. 608,324. In Great Britain May 21, 1926

9 Claims. (Cl. 178—7.1)

This invention relates to picture and the like telegraphy.

Its object is to provide means whereby the elements or points forming a picture or the like, or forming an image thereof, are distributed in a form convenient for reproduction; for example, the said elements or points may be distributed along the circumference of a circle.

The invention is based upon the known phenomenon that if light be projected longitudinally through a rod of material, such as quartz or glass, or through a tube of silver polished on the inside, the said light will pass through the said rod or tube substantially without spreading laterally, even if the said rod or tube be bent to a considerable extent: that is to say, the rod or tube acts as a "light tube".

According to this invention light from the elements or points in a picture or the like or in an image are projected longitudinally through a plurality of "light tubes", which are arranged so as to distribute the said elements or points in a form convenient for reproduction, for example, along the circumference of a circle. The invention is obviously reversible; that is to say, the points of a picture or image may be distributed into a form convenient for reproduction or a picture or image may be formed by light projected from a distributed image.

In one way of carrying out the invention, light from a picture is projected upon the ends of "light tubes" arranged in a rectangular bundle, the said "light tubes" being bent or curved so that their other ends lie along the circumference of a circle. This circle forms what may be termed a cipher of the picture.

A photo-electric cell is caused to travel at a convenient speed, for example, 8 to 10 times per second, around the circle forming the cipher, and the impulses from the said cell are magnified and transmitted in any known way to a receiver. The received currents serve to vary the light from a source which is caused to travel synchronously with the photo-electric cell (at the transmitting station) around the circle formed by the ends of a bundle of "light tubes", arranged similarly to those in the said transmitting station, an image of the picture being thereby formed at the receiving station.

In a modification a photo-electric cell is arranged opposite the "cipher" end of each of the rods in the transmitter, the energy from the cells being utilised to charge condensers which are discharged at close intervals by means of a brush rotating, say, 8 to 10 times per second. The discharge currents are magnified and transmitted to a receiver at which the received currents are utilized to vary the light from a source which is rotated synchronously with the brush (at the transmitting station) opposite the "cipher" ends of the "light tubes".

In place of the rotating source of light at the receiver, there may be employed a plurality of sources arranged one opposite the "cipher" end of each "light tube".

Figure 1:
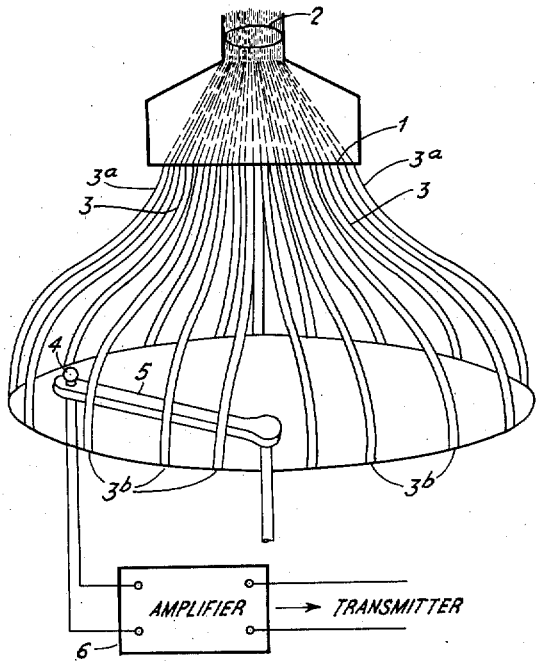
Figure 2:
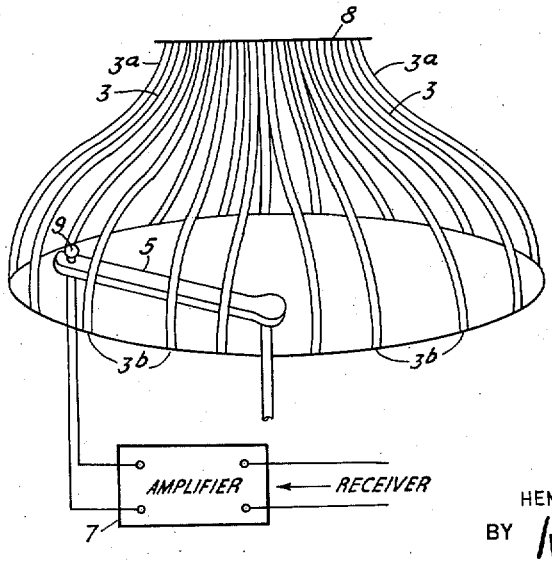
Figure 3:
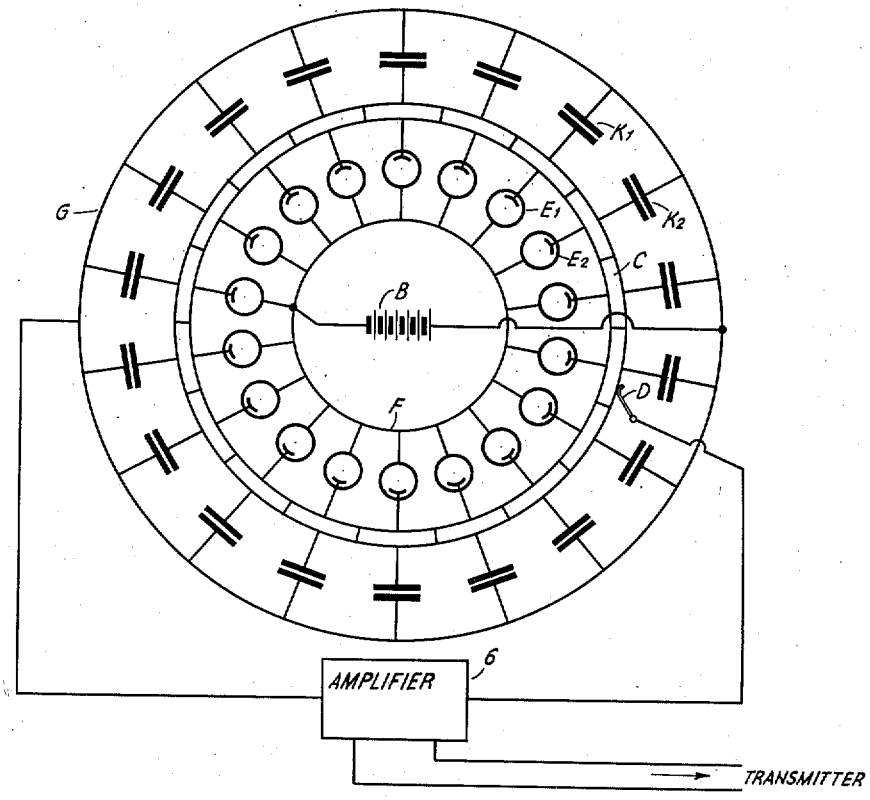
Figure 4:
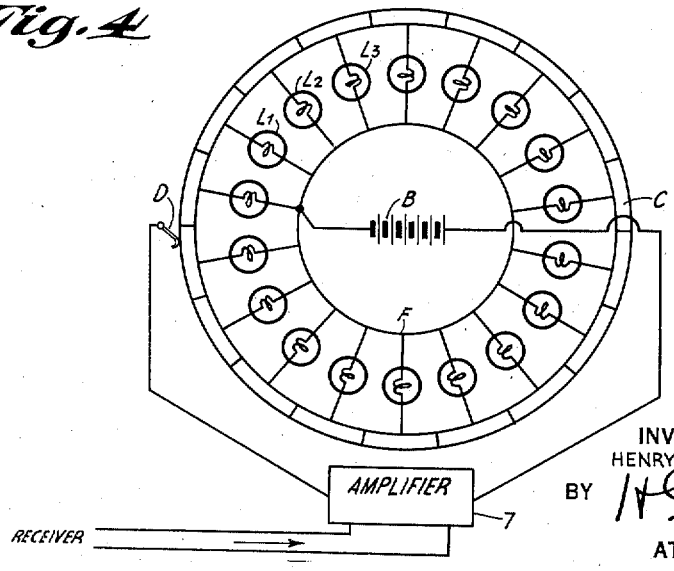

The invention is illustrated in the accompanying drawings in which Figure 1 shows schematically a transmitter arrangement and Figure 2 a receiver arrangement in accordance with the said invention, wherein rotating and synchronously driven photo-cells and light sources are provided; Figure 3 represents a modification of a transmitter using a plurality of photo-cells, one cell being located adjacent to the end of each light tube; and Figure 4 represents a receiver of like characteristics to the transmitter of Figure 3, wherein light sources correspond to the photo-cells of Figure 3.

Referring to Figure 1 1 is a picture through which light is projected from a lens 2 upon the ends 3*a* of a bundle of "light tubes" 3, massed behind the said picture. The light tubes 3 are arranged so that their other ends 3*b* lie along the circumference of a circle around which is driven a photo electric cell 4, carried by a rotating arm 5. It will be seen that the cell 4 passes successively beneath the ends 3*b* of the light tubes 3, and will therefore be influenced by the light transmitted therethrough. The varying electrical output from the cell 4 is amplified by means of an amplifier 6, and then transmitted, for example, by radio or land line, in any well known manner.

The receiving station illustrated in Figure 2 is the complement of the arrangement shown in Figure 1, and comprises a receiving amplifier 7, a plurality of light tubes 3 whose ends 3*b* are arranged along the circumference of a circle, and whose ends 3*a* are massed behind a receiving screen 8, and a lamp or other variable light source 9, fed from the receiving amplifier 7 and carried by means of a rotating arm 5 round the circle of light tubes in synchronism with the photo-electric cell 4 at the transmitter station.

To now make reference to Figure 3 of the drawings a transmitting apparatus of a modified form of that shown in Figure 1 is illustrated. By Figure 3 a plurality of photo electric cells designated $E_1$ $E_2$ etc. are arranged opposite to the ends of the light tubes (not shown by Figure 3) which correspond to the light tubes 3 and 3a of Figures 1 and 2. The photo-electric cells $E_1$ $E_2$ etc. are connected together at one pole to a common ring conductor F to which is connected a source of potential B. The other pole of each photo-electric cell is connected to a separate segment of a commutator C. One pole of a separate condenser $K_1$ $K_2$ etc. is connected to each segment of the commutator C and the other poles are joined to a common ring conductor G to which is connected one input terminal of the amplifier or receiving device 6. The other terminal of the amplifying device 6 is connected to a brush D which rotates on the commutator C. This brush D discharges the condensers $K_1$ $K_2$ etc. in succession and thus impulses proportional to the charges on the condenser are amplified by applying them to the amplifying device 6. In the amplified form the energy is directed to any appropriate form of wire or radio transmitter.

By Figure 4 I have shown a receiving arrangement of similar characteristics to that of the transmitter of Figure 3. In Figure 4 $L_1$ $L_2$ $L_3$ etc. represent a number of lamps or other appropriate light sources, each arranged opposite the end of a light tube (not shown) of similar characteristics to the tubes designated as 3 and 3a of Figures 1 and 2 and for convenience of illustration only 18 of such lamps are represented on the figure. One terminal of each lamp $L_1$ $L_2$ $L_3$ etc. is connected to a common conductor F in the form of a closed ring. The other terminal of the lamps $L_1$ $L_2$ $L_3$ etc. is connected to one segment of a commutator C. A source of potential B is connected between the conductor F and an output terminal of an amplifying device 7, which is associated with any preferred form of receiver for receiving signal energy from transmitters of the character disclosed by Figures 1 and 3 or other preferred form of suitable transmitter, so that the amplifier is controlled by incoming signals. The other output terminal of the amplifier device 7 is connected to a brush contact D which rotates around the commutator C and thus connects each lamp $L_1$ $L_2$ $L_3$ etc. in succession with a control device.

It is thus seen that if a picture be placed corresponding to that picture of Figure 1 designated by the numeral 1 and light directed to the picture so as to pass through the light tubes 3, 3a etc. and finally direct itself to the photo cells $E_1$ $E_2$ etc. of Figure 3 so as to influence a transmitter and the signals are transmitted and picked up by receiving device and amplified so as to flash the lamps $L_1$ $L_2$ $L_3$ etc. which are placed at the end of tubes 3 3a 3b etc. similar to that shown on Figure 2, that a picture represented on Figure 2 as 8 will be produced, without the need of a rapidly rotating arm as has been designated by 5 on Figures 1 and 2. It is to be understood that the rate of influencing the light sources is to be synchronous to that of discharging the capacities associated with the photo-cells of Figure 3; and that the rotary arms 5 of Figures 1 and 2 are similarly synchronously driven. For the synchronization between the transmitter and receiver any preferred form of synchronizer may be used and I therefore do not make claims to the synchronizing apparatus only in so far as it co-operates to complete the combination. The disclosure of Figures 3 and 4 therefore represent a modification of my arrangement which has been found quite useful.

Having described my invention, what I claim is:

1. A picture telegraphy system comprising a picture surface, a plurality of light tubes massed at one end behind said picture surface, said tubes being arranged at the other end to form a picture cipher, a light source, means for projecting light from said source upon said picture surface and through said light tubes in accordance with the intensity of light and shade in said picture surface, light sensitive means associated with the end of each of said tubes forming the said picture cipher for responding to variation in intensity in light and shade of picture as passed through said tubes, a transmitting system and means provided by said light sensitive means for influencing said transmitter in accordance with said varying intensity in light and shade in said picture.

2. A system for picture telegraphy comprising a picture surface, a plurality of light tubes massed behind said picture surface and arranged at the opposite end to form a picture cipher, a light source, means provided for directing light of an intensity proportional to the intensity of light and shadow on said picture surface through said light tubes, a photo-electric element, and means for sequentially subjecting said element to the intensity of light issuing from said tubes, and means for modulating a transmitter in accordance with the current flow produced in said photo-electric element by light impinging thereon.

3. A system of transmitting and receiving pictures which includes a transmitting system having a picture surface, a plurality of light tubes massed behind said picture surface, said tubes being formed at their opposite end in a picture cipher, a light source for directing light through said picture surface and said tubes, light sensitive means at the picture cipher end of said tubes, a transmitter and means provided by said light sensitive means at the end of said tubes for modulating a transmitter in accordance with the intensity of light and shade in said picture.

4. A system for picture telegraphy comprising a picture surface, a plurality of light tubes massed behind said picture surface, said tubes being arranged at the opposite end from said picture surface to form a picture cipher, a light source, means for directing the light from said source through said picture and said light tubes and producing at the end of said tubes forming said picture cipher varying intensities in light and shade in accordance with the shade intensity of said picture surface, a transmitting system and means for continuously and periodically subjecting said transmitter to modulating currents produced by the intensity of light at the end of successive tubes in said picture cipher.

5. A system for picture telegraphy comprising a picture surface, a plurality of light tubes, massed behind said picture surface and arranged on their opposite ends to form a picture cipher, a light source, means for directing light from said source through said picture surface and said light tubes and producing at the end of said light tubes forming such picture cipher varying intensities of light in proportion to the intensity of light and shade in said picture surface, photo-electric means associated with the end of each of said light tubes, a transmitter, and means for continuously and successively associating each of said photo-electric means with said transmitter, whereby said transmitter is modulated continuously and successively by the intensity of light reaching the cipher end of each of said light tubes.

6. A picture transmitting and receiving system including a picture surface to be transmitted, a plurality of light tubes massed behind said picture surface, said light tubes being arranged at one end to form a picture cipher, a light source, means for directing said light from said source through said picture and projecting light varied in intensity in accordance with the light and shade of said picture through said light tubes to form at said cipher end of said light tubes varying intensities of light, a photo-electric cell arranged at the cipher end of each of said tubes, a capacity element associated with each of said photo-electric cells adapted to be charged in accordance with the intensity of current flowing through said photo-electric cells as varied by said light intensity, commutator means for successively discharging said capacities, an amplifier, means for transferring the energy from said commutator to said amplifier and a transmitter for transmitting said amplifier energy.

7. A system for picture telegraphy comprising a picture surface, a plurality of light tubes massed behind said picture surface and arranged at their opposite ends to form the picture cipher, a light source, means for projecting the light issuing from said source through said picture surface and said light tubes and producing at the end of said tubes forming said picture cipher varying intensities of light varied in proportion to the intensity of light and shadow on the said picture surface, a photo-electric element positioned at the end of said light tubes forming said picture cipher, a transmitter, and a commutator, means for sequentially connecting each of said photo-electric elements with said transmitter and modulating said transmitter in a sequential manner, in accordance with the current flow produced through each of said photo-electric elements by varying intensities of light impinging thereon.

8. In a facsimile system in combination, a record area, a plurality of light conveying tubes having one end thereof massed behind said area and the opposite ends formed into a record cipher, and a control element adapted to cyclically traverse said cipher, each of said tubes being adapted to have light of an intensity proportional to the intensity of light and shadow of corresponding elemental areas of the record area directed therethrough.

9. In an electro-optical image system a viewing area, a plurality of light conveying means having one end thereof masked behind said area and the opposite ends formed into a cipher, control means adapted to traverse cyclically said cipher, and means to produce and direct light into each of said light conveying means so that light of an intensity proportional to the intensity of light and shadow corresponding to elemental areas of a viewed area may be directed through said last named means to produce in the viewing area an electro-optical representation.

HENRY JOSEPH ROUND.